(12) United States Patent
Bateman

(10) Patent No.: US 8,407,865 B2
(45) Date of Patent: Apr. 2, 2013

(54) TIE-DOWN TENSION ENHANCER

(76) Inventor: Robert L. Bateman, Huntington Beach, CA (US)

( * ) Notice: Subject to any disclaimer, the term of this patent is extended or adjusted under 35 U.S.C. 154(b) by 191 days.

(21) Appl. No.: 13/019,065

(22) Filed: Feb. 1, 2011

(65) Prior Publication Data

US 2012/0192389 A1    Aug. 2, 2012

(51) Int. Cl.
*B25B 25/00* (2006.01)
(52) U.S. Cl. .................................. 24/68 CD; 24/170
(58) Field of Classification Search ............ 24/68 R, 24/71.1, 68 SB, 68 CD, 68 A, 68 D, 68 E, 24/68 F, 170, 191; 410/100, 103; 254/250–252
See application file for complete search history.

(56) References Cited

U.S. PATENT DOCUMENTS

| | | | |
|---|---|---|---|
| 164,910 A | 6/1875 | Duffy | |
| 550,970 A | 12/1895 | Hemenway | |
| 625,453 A | 5/1899 | Martz | |
| 978,357 A | 12/1910 | Christman | |
| 1,215,391 A | 2/1917 | Lofquist | |
| 1,586,174 A | 5/1926 | Bell | |
| 1,725,130 A | 8/1929 | Ciferskor | |
| 2,873,090 A * | 2/1959 | Hale et al. | 254/250 |
| 3,252,189 A | 5/1966 | Kanneworff et al. | |
| 3,279,759 A | 10/1966 | Tallman | |
| 3,711,901 A | 1/1973 | Close | |
| 3,858,279 A | 1/1975 | Brattstrom | |
| 4,395,796 A | 8/1983 | Akaura et al. | |
| 5,426,827 A | 6/1995 | Tracy et al. | |
| 5,809,618 A | 9/1998 | Perhacs | |
| 2007/0215848 A1 | 9/2007 | Gaudreault et al. | |

* cited by examiner

*Primary Examiner* — James Brittain
(74) *Attorney, Agent, or Firm* — Walter A. Hackler; Marc G. Martino

(57) ABSTRACT

A tie-down tension enhancer for in-situ tightening of an installed tie down having a locking mechanism. The tension enhancer generally includes a body having openings for transverse insertion and removal of a line or strap as well as longitudinal movement of the line or strap within the body. A cinch is provided and disposed on the body for engaging the line or strap upon longitudinal movement of the line or strap in one direction and a line or strap mechanism is provided and spaced apart from the cinch for enabling pulling of the line or strap past the cinch for providing further tension to the existing tie down.

11 Claims, 5 Drawing Sheets

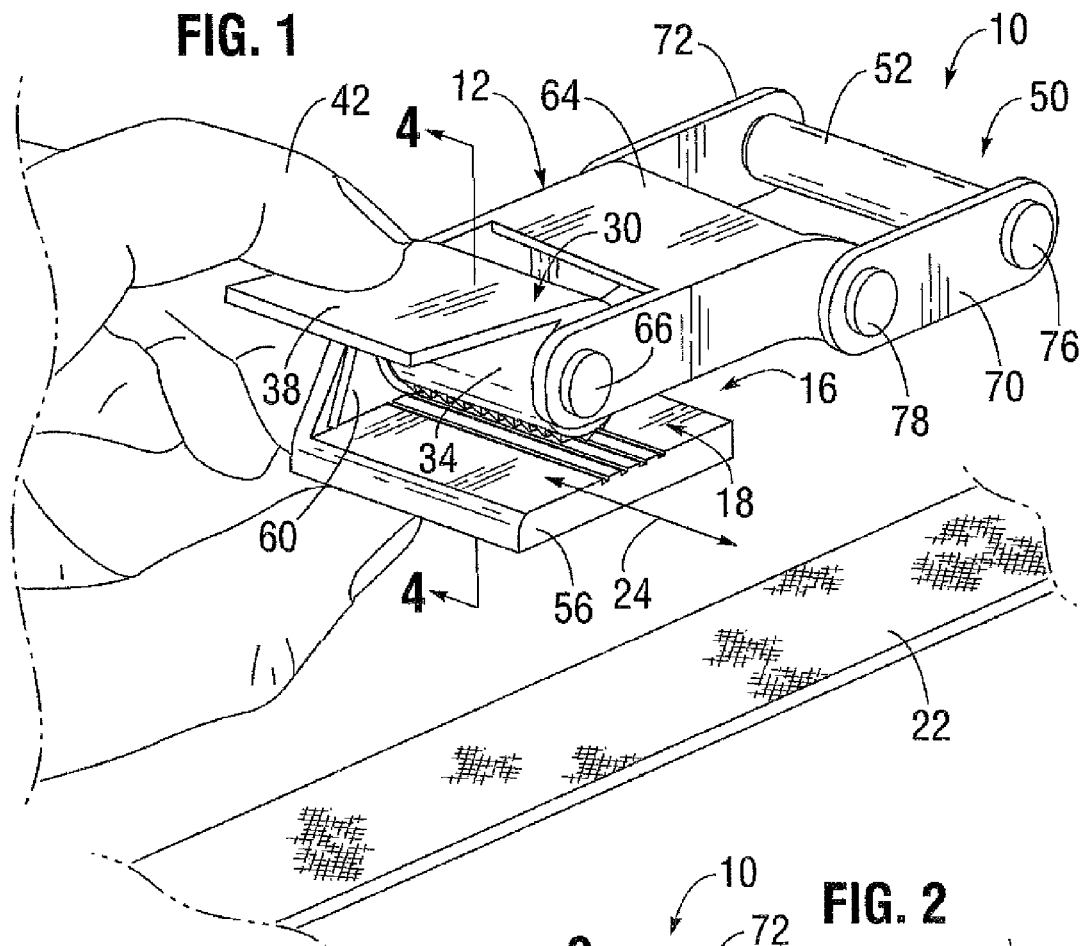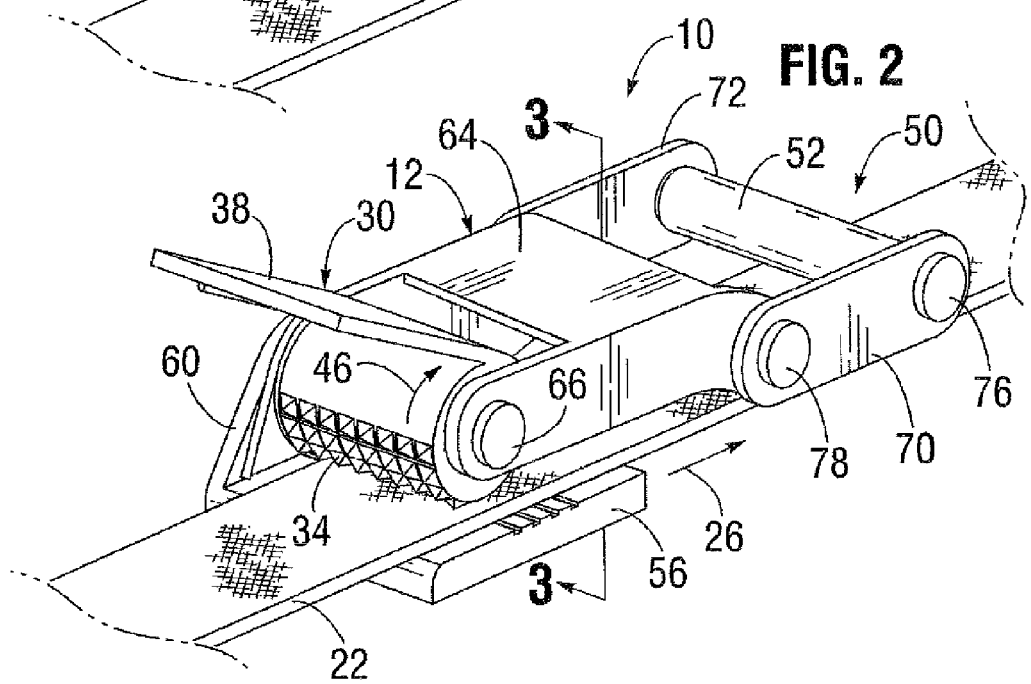

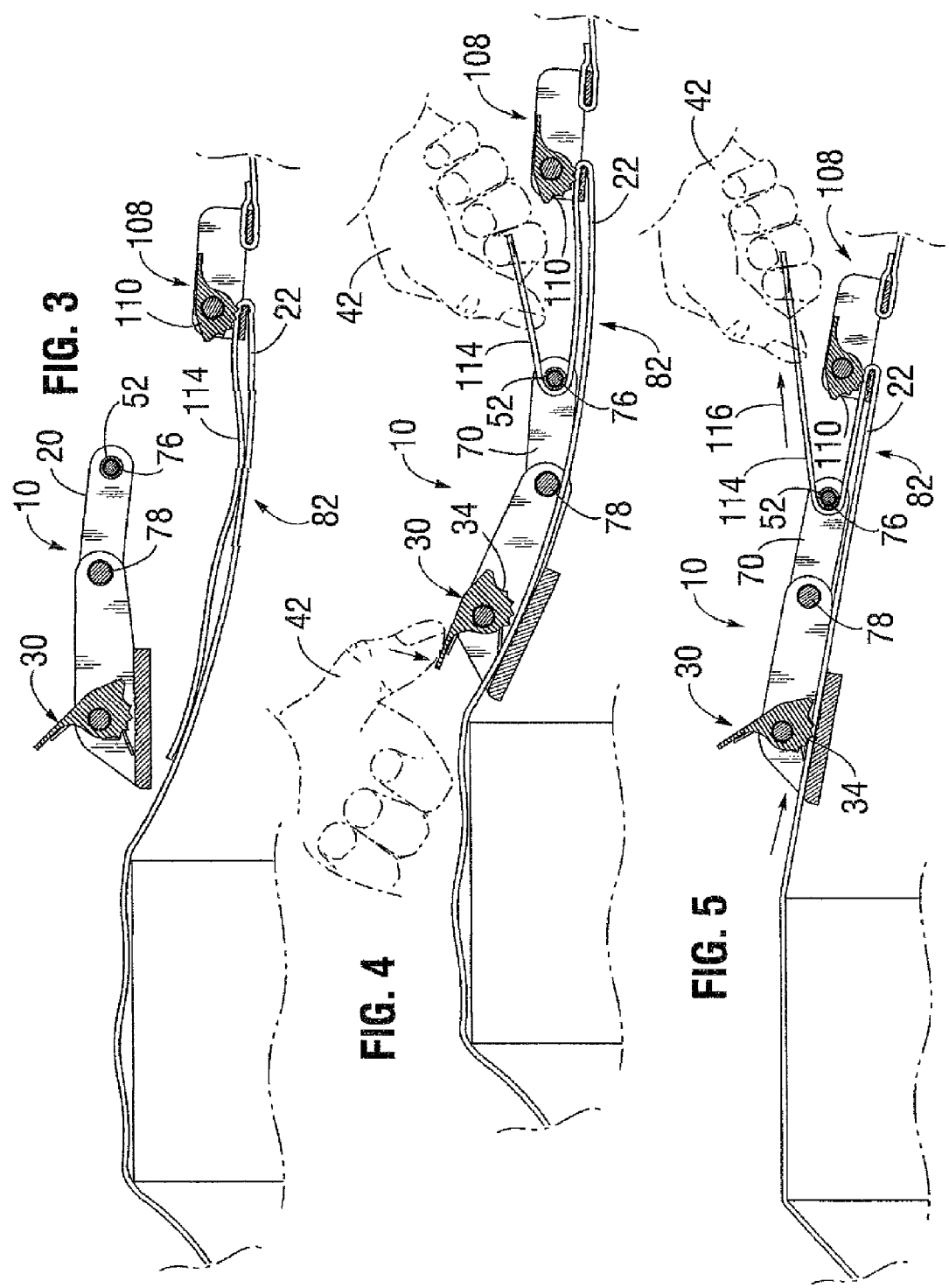

TIE-DOWN TENSION ENHANCER

The present invention generally relates line tightening devices and is especially concerned with tightening a strap to hold loads under tension and firmly in a given position.

Tie-down devices provide releasable tensioning and clasping mechanisms for a line or flexible strap in order to tie down either heavy, or loose loads, on racks or the like in order to prevent unwanted movement of such loads during transport.

When providing tension for a tie-down for holding a load of any kind, especially when the load consists of a number of articles, considerable tension must be exerted on the line to provide a stable and secure load.

Unfortunately, with many tie-downs, it is difficult to provide proper tension and accordingly the present invention provides for a detachable tie down tension enhancing for in-situ tightening of an installed tie-down.

SUMMARY OF THE INVENTION

A detachable tie-down tension enhancer for in-situ tightening of an installed tie-down having a locking mechanism generally includes a body having openings for enabling transverse insertion and removal of a line or strap and longitudinal movement of the line or a strap within the body. In this manner, the tension enhancer in accordance with the present invention is utilized in conjunction with a conventional tie-down already secured. The body of the present invention enables attachment and removal from the existing tie-down, after further tightening of the existing tie-down by the tension enhancer in accordance with the present invention.

A cinch is provided and disposed on the body, for engaging the line or strap upon longitudinal movement in one direction and release of the line or strap upon longitudinal movement in an opposite direction.

A line or strap mechanism is disposed in a spaced apart relationship with the cinch on the body for enabling pulling of the line or strap past the cinch in the opposite direction.

More particularly, the tension enhancer in accordance with the present invention includes a body opening provided by a bottom plate connected to an upstanding side plate and a top plate connected to the side plate in a spaced apart relationship with the bottom plate. In this matter, one side of the tension enhancer in accordance with the present invention is open for receiving the line or strap.

The cinch in accordance with the present invention may include a pawl, which is pivotably mounted to the top plate for engaging a liner strap upon movement of the liner strap in the one direction. Preferably, the cinch includes a depressible lever for disengaging the pawl from the liner strip prior to removal of the tension enhancer from the installed tie-down.

In addition, the liner strap mechanism includes a roller preferably supported by a pair of articulated arms extending from the top plate.

In combination with a tie-down, the present tension enhancer provides for a tie-down system as will be hereinafter described in greater detail.

BRIEF DESCRIPTION OF THE DRAWINGS

The advantages and features of the present invention will be better understood by the following description when considered in conjunction with the accompanying drawings in which:

FIG. 1 is a perspective view of a detachable tie-down tension enhancer in accordance with the present invention generally illustrating the body having openings for enabling insertion and removal of line or strap as well as longitudinal movement or a strap, shown separately, along with a cinch and a line or strap mechanism;

FIG. 2 is a perspective view similar to that shown in FIG. 1 with a line or strap inserted into the tensioner in accordance with the present invention;

FIG. 3 is a cross sectional view of the tensioner shown in FIG. 2 taken along the line 3-3 and further illustrating the tensioner in accordance with the present invention before installation on an installed tie-down;

FIG. 4 is a cross sectional view of the tension enhancer shown in FIG. 1 taken along the line 4-4 and further illustrating the installation of the tensioner on the installed tie-down;

FIG. 5 is a view similar to that of FIG. 4 illustrating the use of the tensioner in accordance with the present invention for further tightening of the installed tie-down.

DETAILED DESCRIPTION

Figure 6:
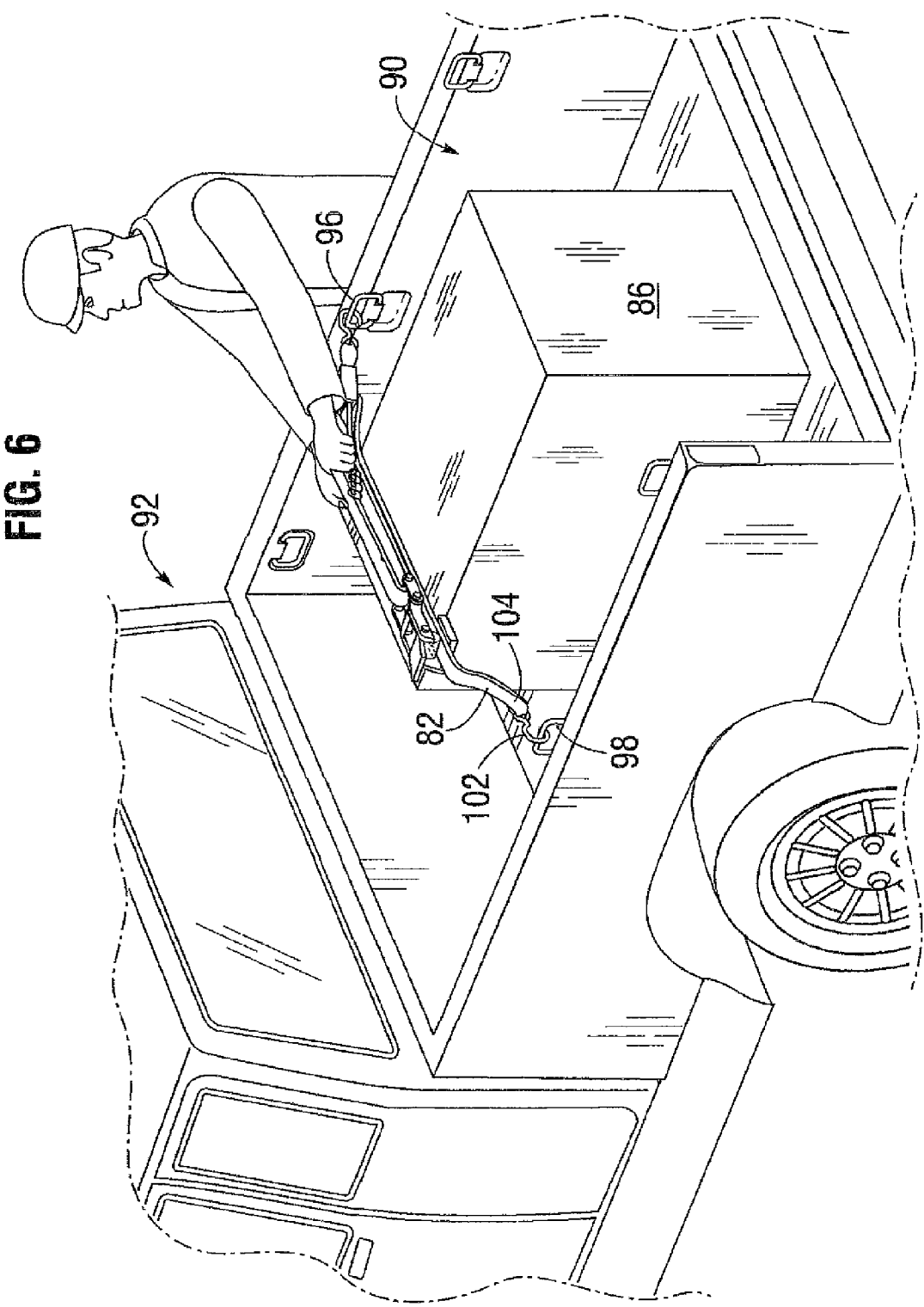
FIGS. 6-8 are illustrations of the use of the tensioner in accordance with the present invention with securing a load in a truck.

With reference to FIGS. 1 and 2, there is shown a tensioner 10 in accordance with the present invention which generally includes a body 12 having openings 16, 18 for enabling transverse insertion of a line or strap 22 into the body 12, as illustrated by an arrow 24 as well as longitudinal movement of the liner strap 22, as illustrated by the arrow 26 in FIG. 2.

A cinch 30, which includes a pawl 34, is provided on the body for engaging the line or strap 22 upon longitudinal movement illustrated by the arrow 26 and release of the line or strap 22 upon movement of an opposite direction or upon depression of a level 38 by a user 42, as illustrated in FIGS. 1, 3, and 4 in a direction shown by arrow 46 in FIG. 2.

A mechanism 50, preferably a roller 52 is disposed in a spaced apart relationship with the cinch 30 on the body for enabling pulling of the line or strap 22 past the cinch 30, as indicated by the arrow 26 in FIG. 2 and illustrated in FIGS. 4 and 5.

With reference again to FIGS. 1 and 2, the opening 16 and 18 are provided by a bottom plate 56 connected to a side plate 60 and a top plate 64, the top plate 63 being connected to the side plate 60 in a space apart relationship with the bottom plate 56 as best seen in FIGS. 1 and 3. The pawl 34 is pivotably mounted to the top plate 64 by way of a pin 66 and the roller 52 is suspended by a pair of articulated arms 70, 72 utilizing pins 76, 78 in a conventional manner, the articulated arms 70, 72 extending from the top plate 64 as illustrated.

Figure 7:
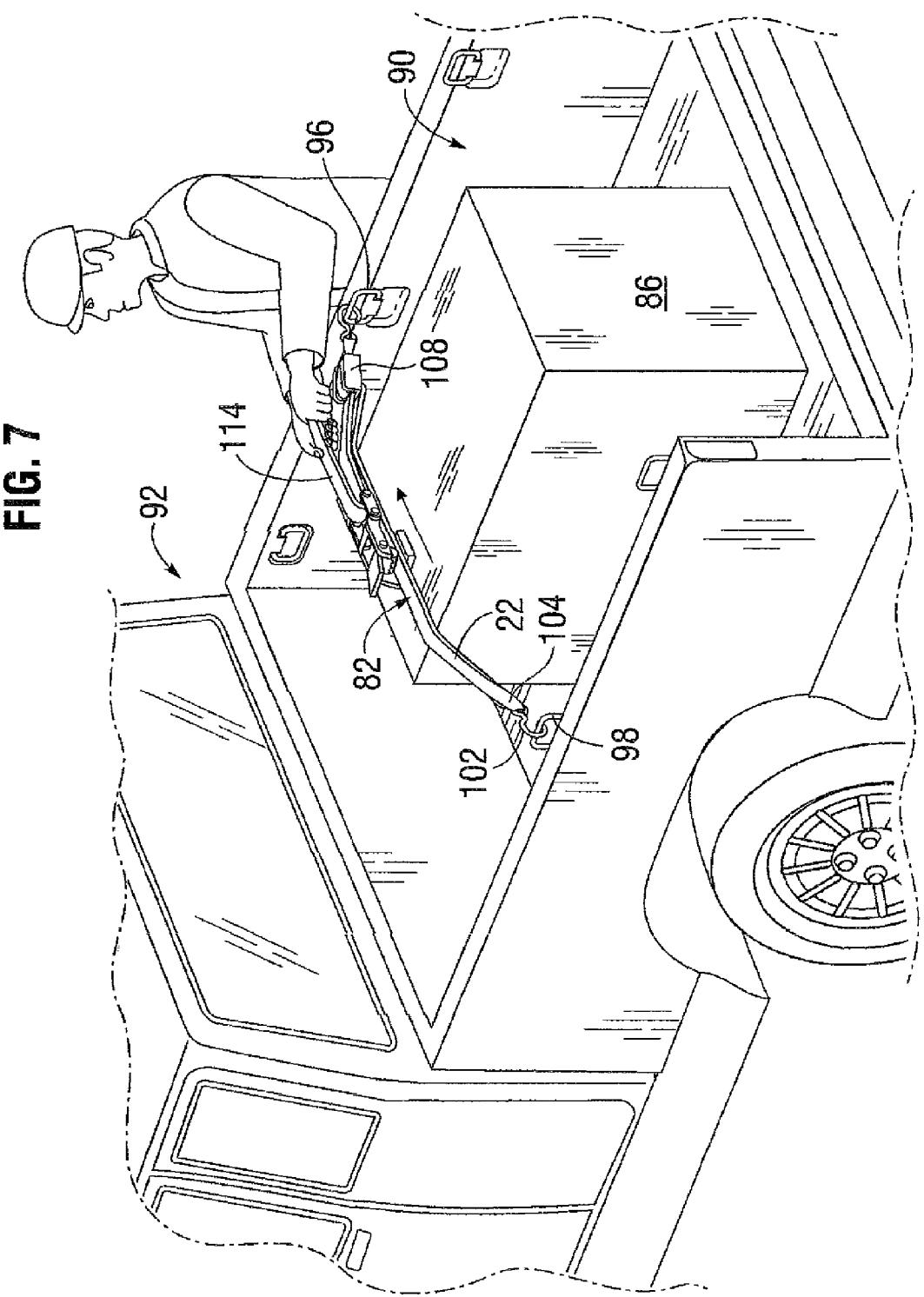
Figure 8:
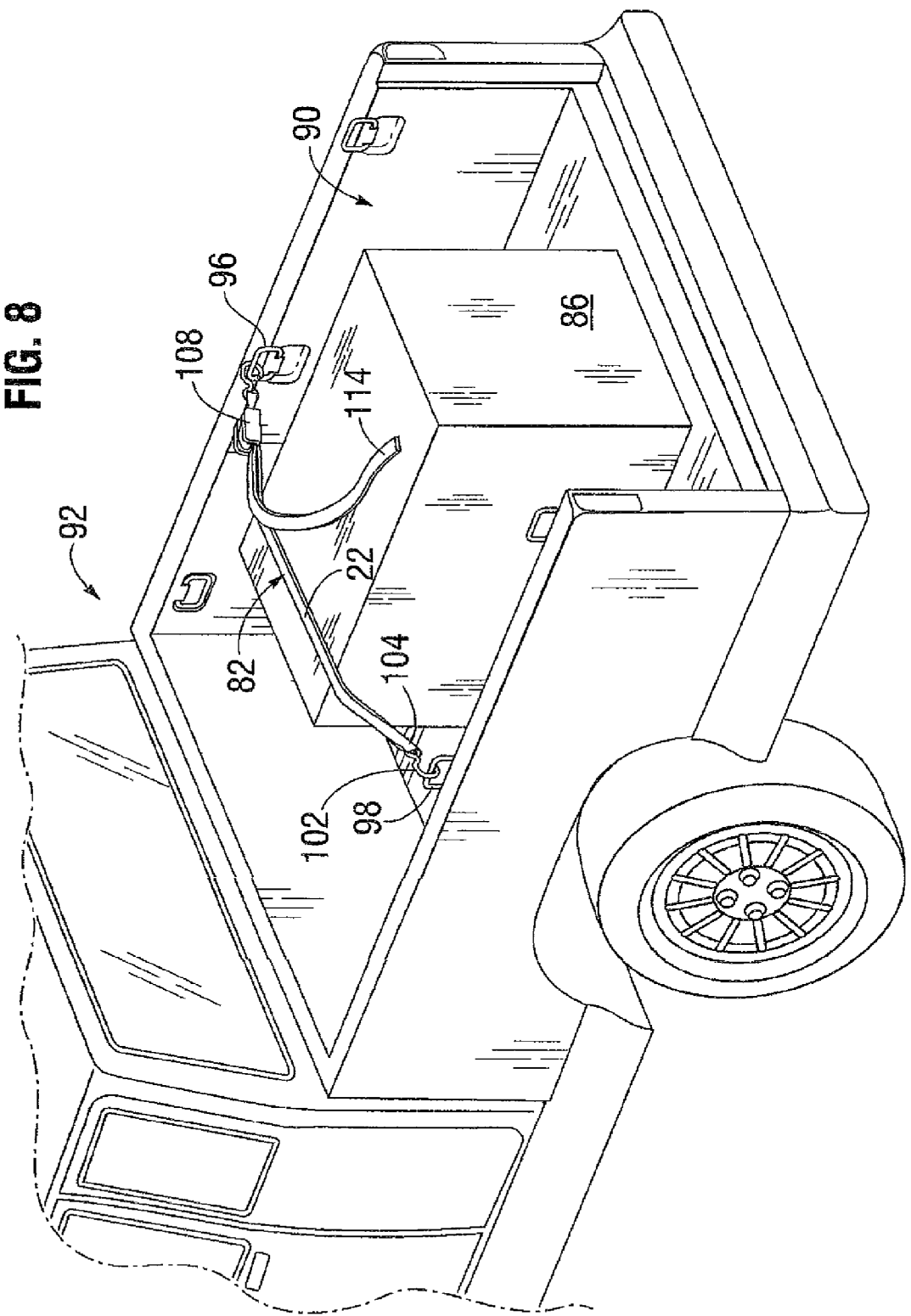

FIGS. 3-9 illustrate use and operation of the tensioner 10 in accordance with the present invention in combination with a conventional tie down 82 for securing a load in the body 90 of a truck 92 between the two points, such as cleats 96, 98.

The tie-down 82 may be of convention design, including a hook 102 at one end 104 thereof, and a locking mechanism 108 which may be conventional in design and include a pawl 110 for engaging the line or strap 22 as illustrated in FIGS. 3-9.

In operation, after installing the tie-down 82 and providing initial tension by puling on a loose end 114, the tensioner is slipped on the strapper opening with the loose end 114 wrapped around the ruler 52 which is then pull in the direction of the arrow 116.

Thus, the tensioner 10 in accordance with the present invention provides for a greater mechanical advantage for tensioning the original installed tie-down. It should be appreciated that while only one roller 52 is shown, the line or strap mechanism 50 may include a plurality of rollers (not shown)

to further enhance the mechanical advantaged in pulling of the loose end at 114 of the tie-down 82.

After increased tension is applied to the tie-down 82 by the tensioner 10 in accordance with the present invention, such tension is maintained by the tie-down pawl 110 and the tensioner 10 removed from the tie-down 82 by releasing the cinch 30 by rotation of the pawl 34 as hereinbefore described.

Although there has been hereinabove described a specific detachable tie-down tension enhancer in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A detachable tie-down tension enhancer for in-situ tightening of an installed tie-down having a locking mechanism, the tension enhancer comprising:
    a body having openings for enabling transverse insertion and removal of a line or strap and longitudinal movement of the line or strap within said body, wherein said body openings are provided by a bottom plate connected to an upstanding side plate and a top plate connected to the side plate in a spaced apart relationship with said bottom plate;
    a cinch, disposed on said body, for engaging the line or strap upon longitudinal movement in one direction and release of the line or strap upon longitudinal movement in an opposite direction; and
    a line or strap mechanism, disposed in a spaced apart relationship with said cinch on said body, or enabling pulling of the line or strap past said cinch in the opposite direction.

2. The tension enhancer according to claim 1 wherein said cinch comprises a pawl pivotably mounted to said top plate for engaging the line or strap upon movement of the line or strap in said one direction.

3. The tension enhancer according to claim 2 wherein said cinch further comprises a depressable lever for disengaging said panel from the line or strap.

4. The tension enhancer according to claim 3 wherein the line or strap mechanism comprises a roller.

5. The tension enhancer according to claim 4 wherein the line or strap mechanism further comprises a pair of articulated arms supporting said roller and extending from said top plate.

6. A detachable tie down system comprising:
    a tie-down including a line or strap with a locking mechanism for tightening said tie-down between two points;
    a detachable tie-down tension enhancer for an installed tie-down, the tension enhancer including:
    a body having openings for enabling transverse insertion and removal of the line or strap and longitudinal movement of the line or strap within said body, wherein said body openings are provided by a bottom plate connected to an upstanding side plate and a top plate connected to the side plate in a spaced apart relationship with said bottom plate;
    a cinch, disposed on said body, for engaging the line or strap upon longitudinal movement in one direction and release of the line or strap upon longitudinal movement in an opposite direction; and
    a line or strap mechanism, disposed in a spaced apart relationship with said cinch on said body, or enabling pulling of the line or strap past said cinch in the opposite direction.

7. The tension enhancer according to claim 6 wherein said cinch comprises a pawl pivotably mounted to said top plate for engaging the line or strap upon movement of the line or strap in said one direction.

8. The tension enhancer according to claim 7 wherein said cinch further comprises a depressable lever for disengaging said panel from the line or strap.

9. The tension enhancer according to claim 8 wherein the line or strap mechanism comprises a roller.

10. The tension enhancer according to claim 9 wherein the line or strap mechanism further comprises a pair of articulated arms supporting said roller and extending from said top plate.

11. A detachable tie-down tension enhancer, comprising:
    a body comprising a bottom plate and a top plate both extending from an upstanding side plate, where the bottom plate and top plate are in a spaced apart relationship forming an opening for enabling transverse insertion and removal of a line or strap and longitudinal movement of the line or strap within said body;
    a cinch, disposed on said body, for engaging the line or strap upon longitudinal movement in one direction and release of the line or strap upon longitudinal movement in an opposite direction; and
    a line or strap mechanism, disposed in a spaced apart relationship with said cinch on said body, or enabling pulling of the line or strap past said cinch in the opposite direction.

\* \* \* \* \*